United States Patent [19]

Barry et al.

[11] Patent Number: 4,560,532

[45] Date of Patent: Dec. 24, 1985

[54] NUCLEAR FUEL ASSEMBLY

[75] Inventors: Robert F. Barry, Monroeville; Susan C. Delzell; Wilson, John F., both of Murrysville, all of Pa.; Theodore W. Nylund, Columbia, S.C.

[73] Assignee: Westinghouse Electric Corp., Pittsburgh, Pa.

[21] Appl. No.: 550,669

[22] Filed: Nov. 10, 1983

Related U.S. Application Data

[62] Division of Ser. No. 368,555, Apr. 15, 1982.

[51] Int. Cl.[4] .............................................. G21C 3/30
[52] U.S. Cl. ................................. 376/434; 376/444; 376/445; 376/446
[58] Field of Search ............... 376/434, 444, 446, 352, 376/438, 362, 364, 442, 440, 445

[56] References Cited

U.S. PATENT DOCUMENTS

| | | | |
|---|---|---|---|
| T909,019 | 4/1973 | Patterson, Jr. | 376/352 |
| 1,523,194 | 1/1925 | Gutzwiller | 403/242 X |
| 1,648,026 | 11/1927 | Murray | 403/242 X |
| 3,133,867 | 5/1964 | Frisch | 376/438 |
| 3,379,618 | 4/1968 | Frisch | 376/442 |
| 3,389,056 | 6/1968 | Frisch | 376/442 X |
| 3,401,081 | 9/1968 | Menzel et al. | 376/352 X |
| 3,607,639 | 9/1971 | Van Santen | 376/438 |
| 3,689,358 | 9/1972 | Smith et al. | 376/444 X |
| 3,713,971 | 1/1973 | Van Santen et al. | 376/352 X |
| 3,791,466 | 2/1974 | Patterson et al. | 376/446 X |
| 3,888,732 | 6/1975 | Berglund et al. | 376/352 X |
| 3,913,689 | 10/1975 | Andersson et al. | 376/434 X |
| 3,915,793 | 10/1975 | Andersson et al. | 376/352 X |
| 4,195,943 | 4/1980 | Williams | 403/242 X |
| 4,348,353 | 9/1982 | Christiansen et al. | 376/446 X |
| 4,348,355 | 9/1982 | Nylund | 376/434 |
| 4,416,852 | 11/1983 | Nylund | 376/446 X |

FOREIGN PATENT DOCUMENTS

| | | | |
|---|---|---|---|
| 1150423 | 7/1983 | Canada | 376/444 X |
| 0027984 | 5/1981 | European Pat. Off. | 376/352 |
| 0036142 | 9/1981 | European Pat. Off. | 376/444 X |
| 2823433 | 1/1979 | Fed. Rep. of Germany | 376/352 |
| 1334361 | 5/1962 | France | 376/434 |
| 0027789 | 3/1978 | Japan | 376/352 |
| 0047086 | 4/1979 | Japan | 376/434 |
| 194389 | 11/1982 | Japan | 376/434 |
| 1029922 | 5/1966 | United Kingdom | 376/446 |

Primary Examiner—Deborah L. Kyle
Assistant Examiner—Dan Wasil
Attorney, Agent, or Firm—D. E. Erickson

[57] ABSTRACT

A nuclear fuel assembly includes and upper yoke, a base, an elongated, outer flow channel disposed substantially along the entire length of the fuel assembly and an elongated, internal, central water cross, formed by four, elongated metal angles, that divides the nuclear fuel assembly into four, separate, elongated fuel sections and that provides a centrally disposed path for the flow of subcooled neutron moderator along the length of the fuel assembly. A separate fuel bundle is located in each of the four fuel sections and includes an upper tie plate, a lower tie plate and a plurality of elongated fuel rods disposed therebetween. Preferably, each upper tie plate is formed from a plurality of interconnected thin metal bars and includes an elongated, axially extending pin that is received by the upper yoke of the fuel assembly for restraining lateral motion of the fuel bundle while permitting axial movement of the fuel bundle with respect to the outer flow channel. The outer flow channel is fixedly secured at its opposite longitudinal ends to the upper yoke and to the base to permit the fuel assembly to be lifted and handled in a vertical position without placing lifting loads or stresses on the fuel rods. The yoke, removably attached at the upper end of the fuel assembly to four structural ribs secured to the inner walls of the outer flow channel, includes, as integrally formed components, a lifting bail or handle, laterally extending bumpers, a mounting post for a spring assembly, four elongated apertures for receiving with a slip fit the axially extending pins mounted on the upper tie plates and slots for receiving the structural ribs secured to the outer flow channel. Locking pins securely attach the yoke to the structural ribs enabling the fuel assembly to be lifted as an entity.

7 Claims, 25 Drawing Figures

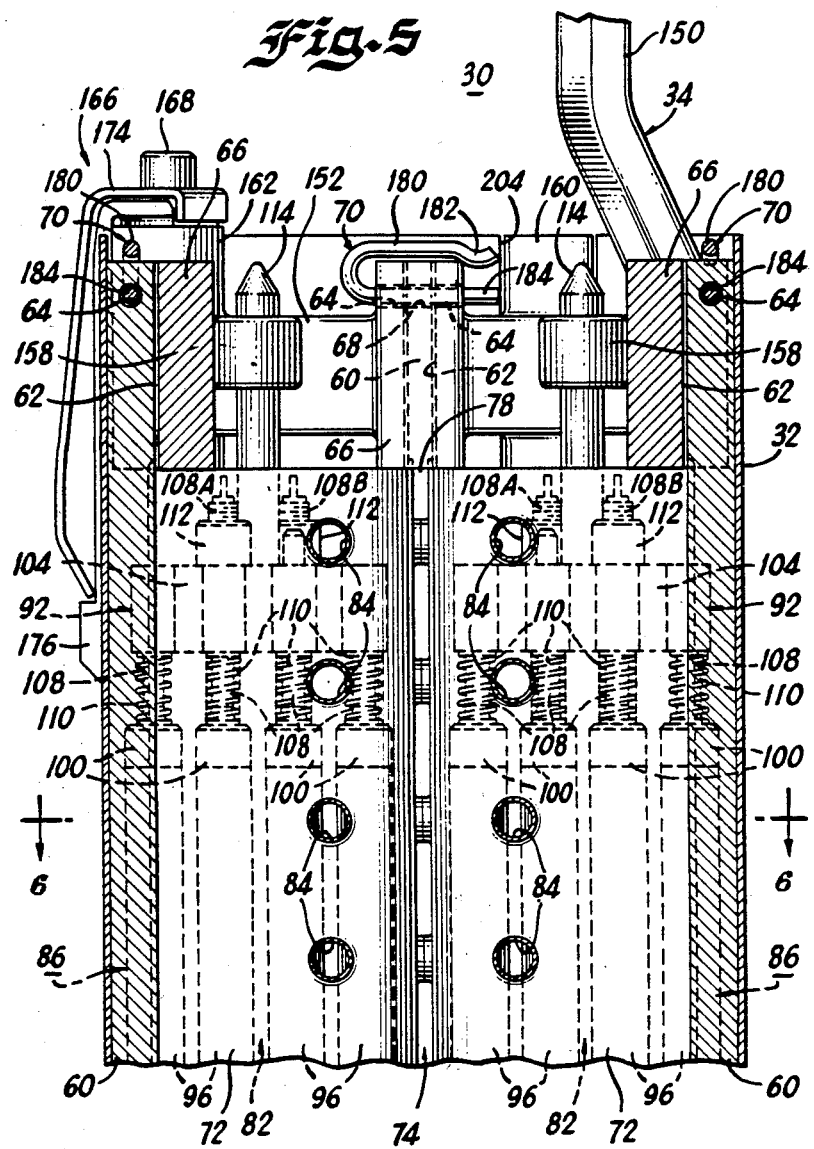

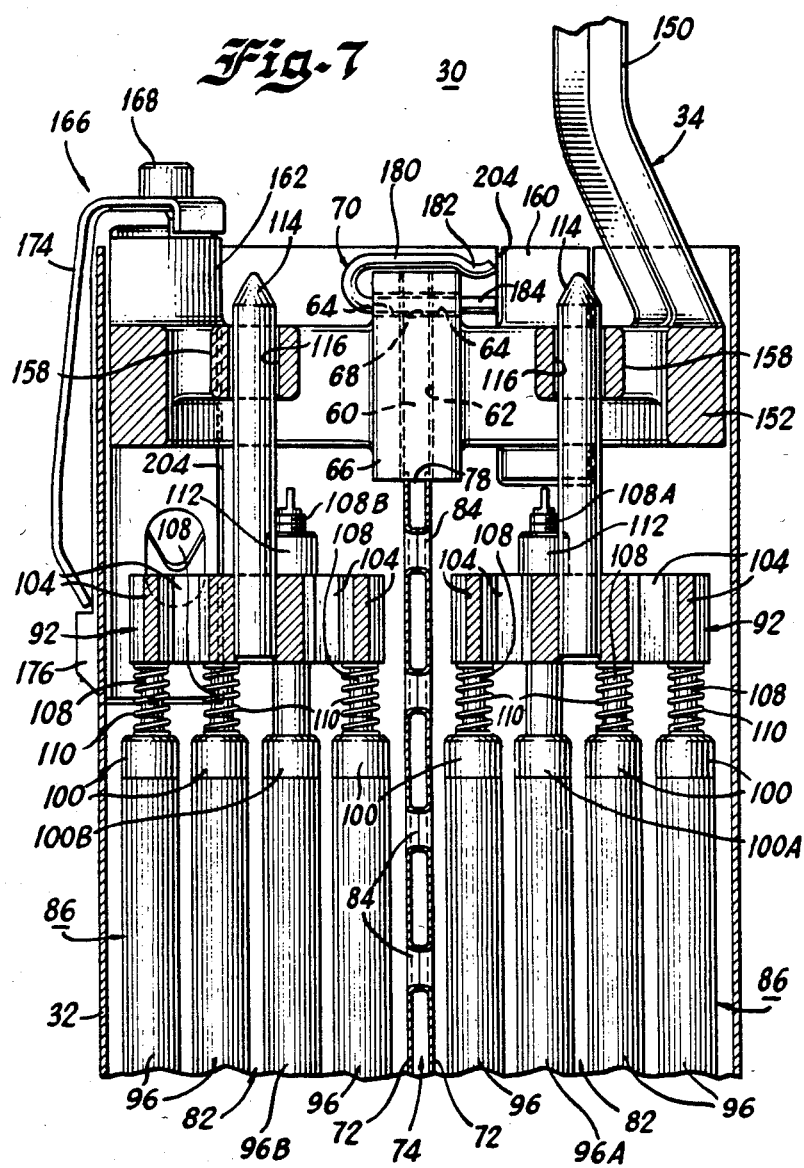

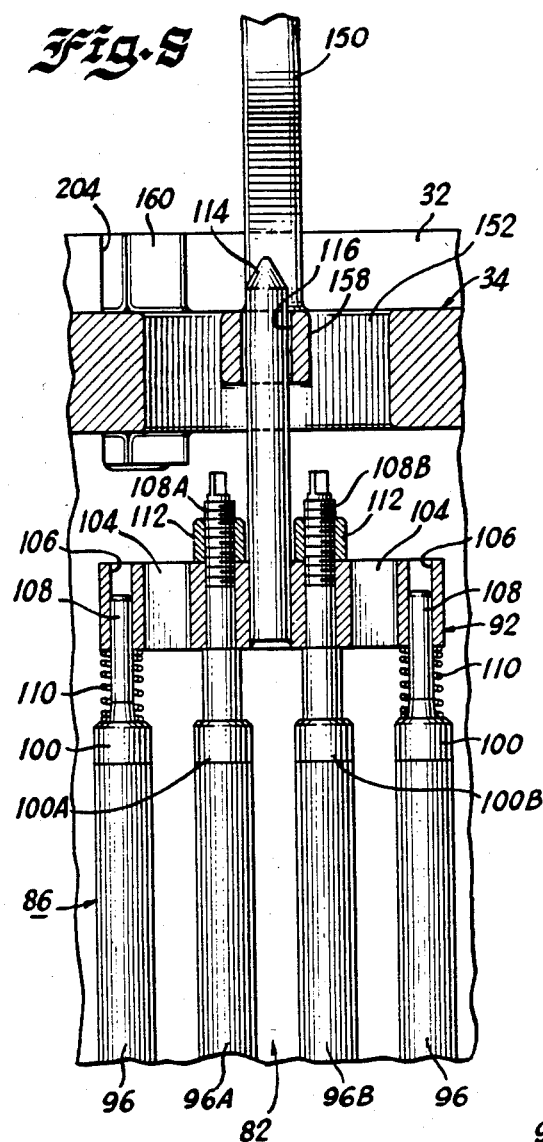
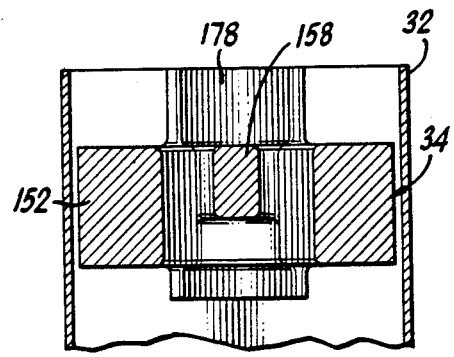
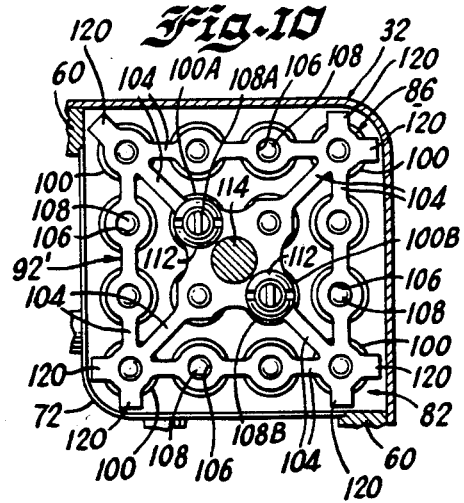

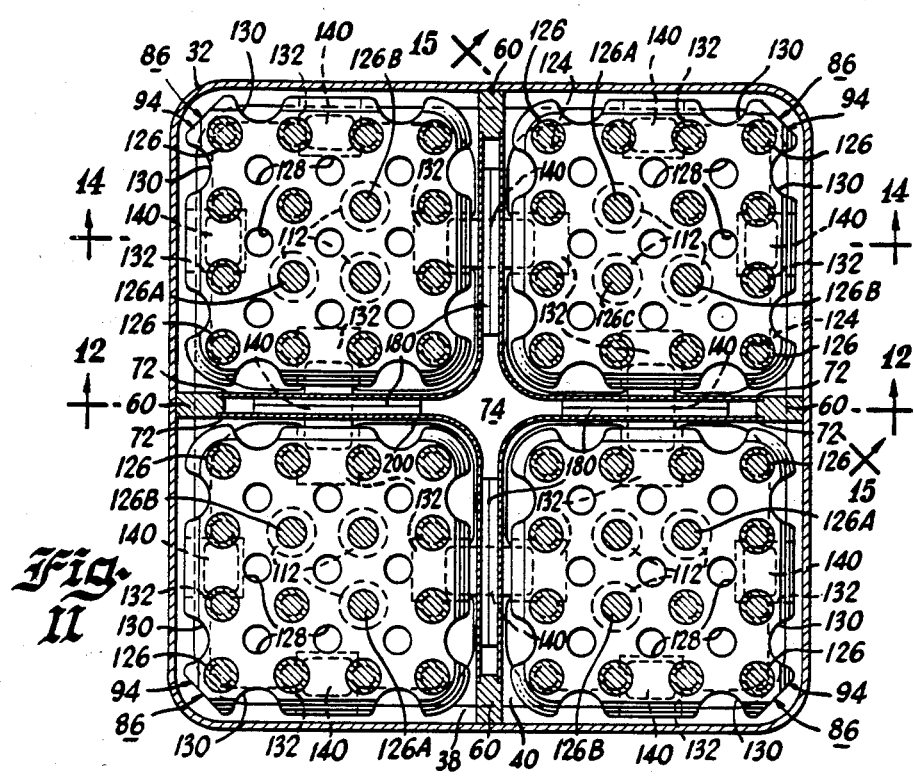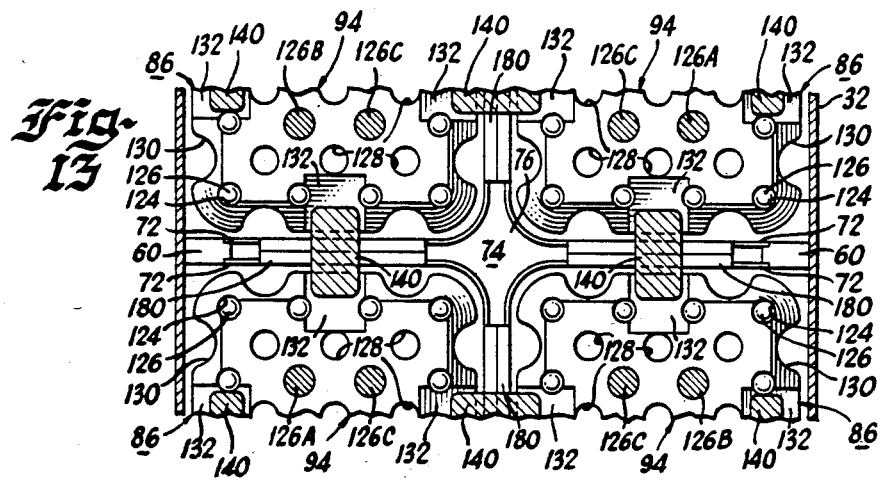

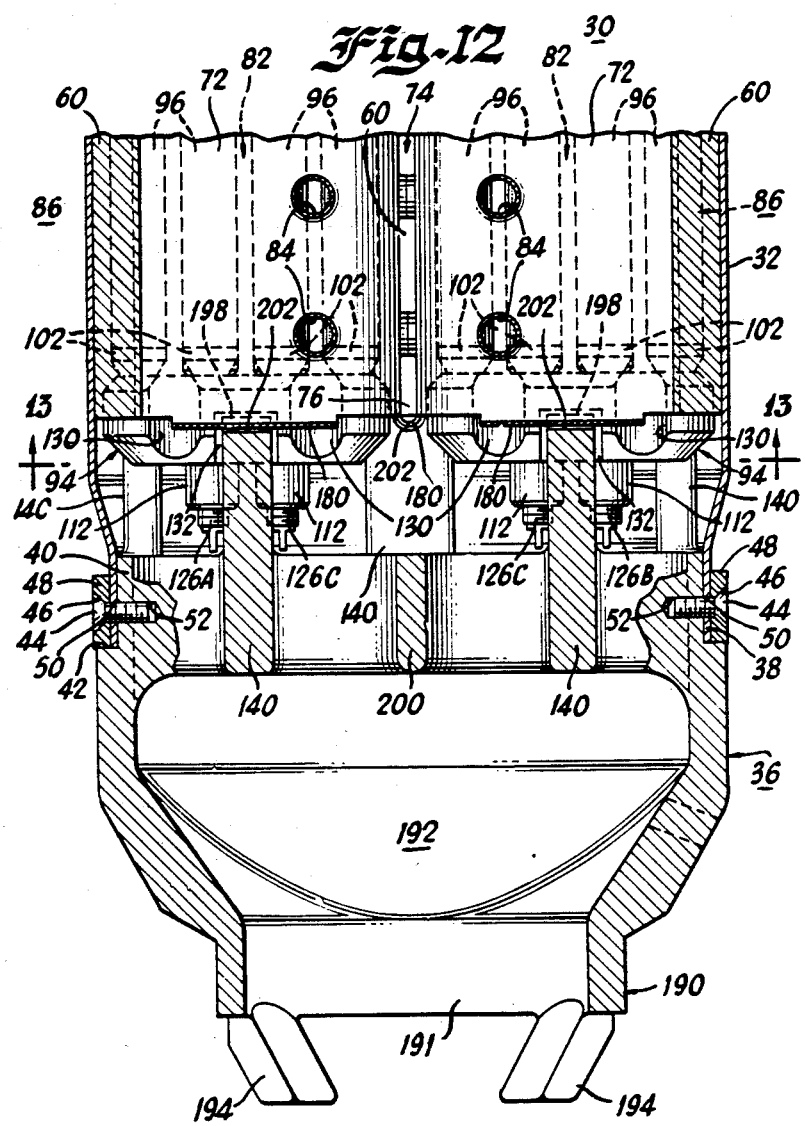

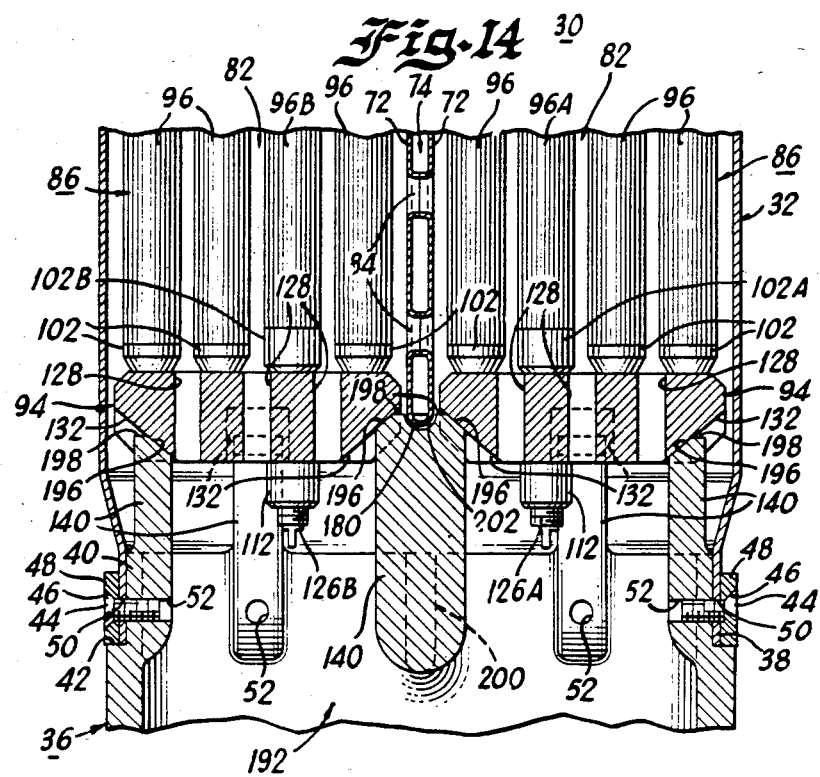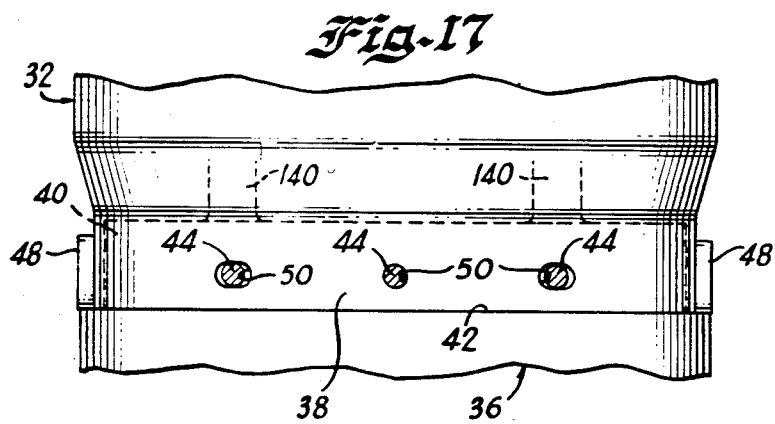

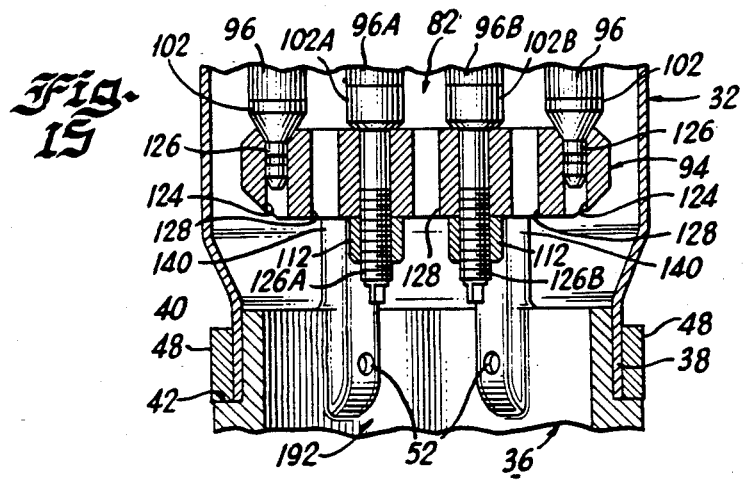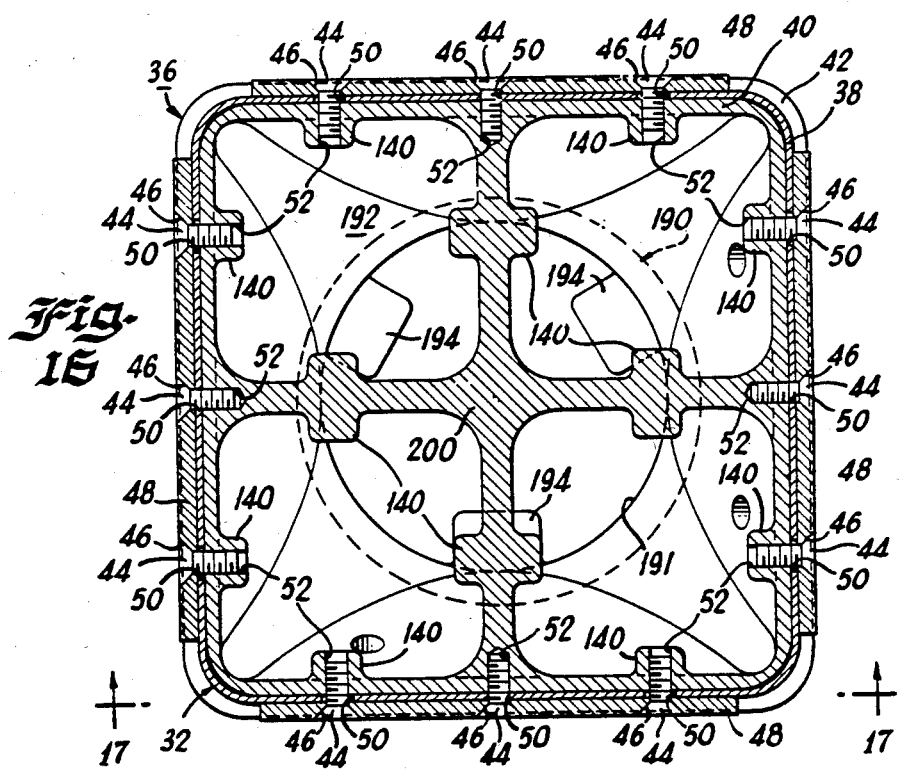

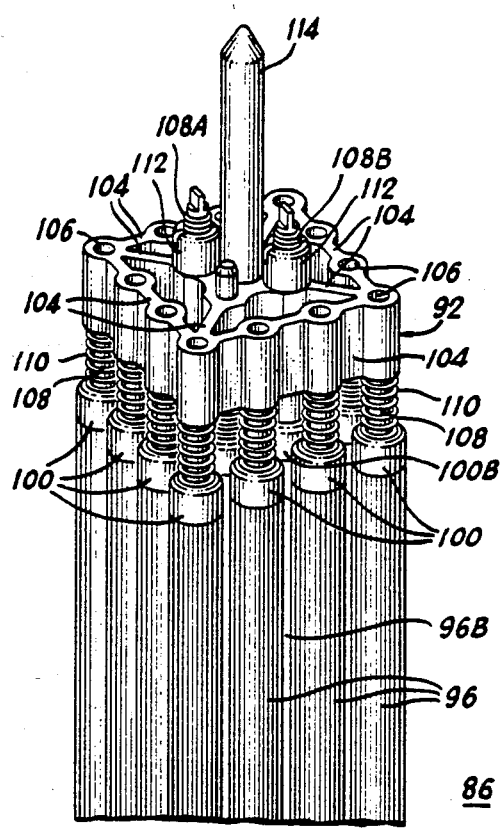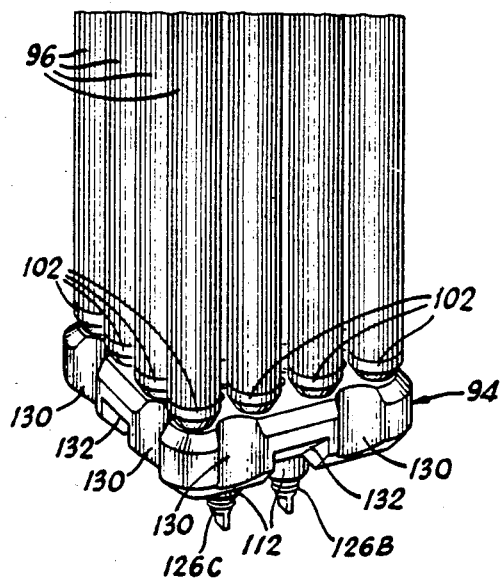
Fig-19

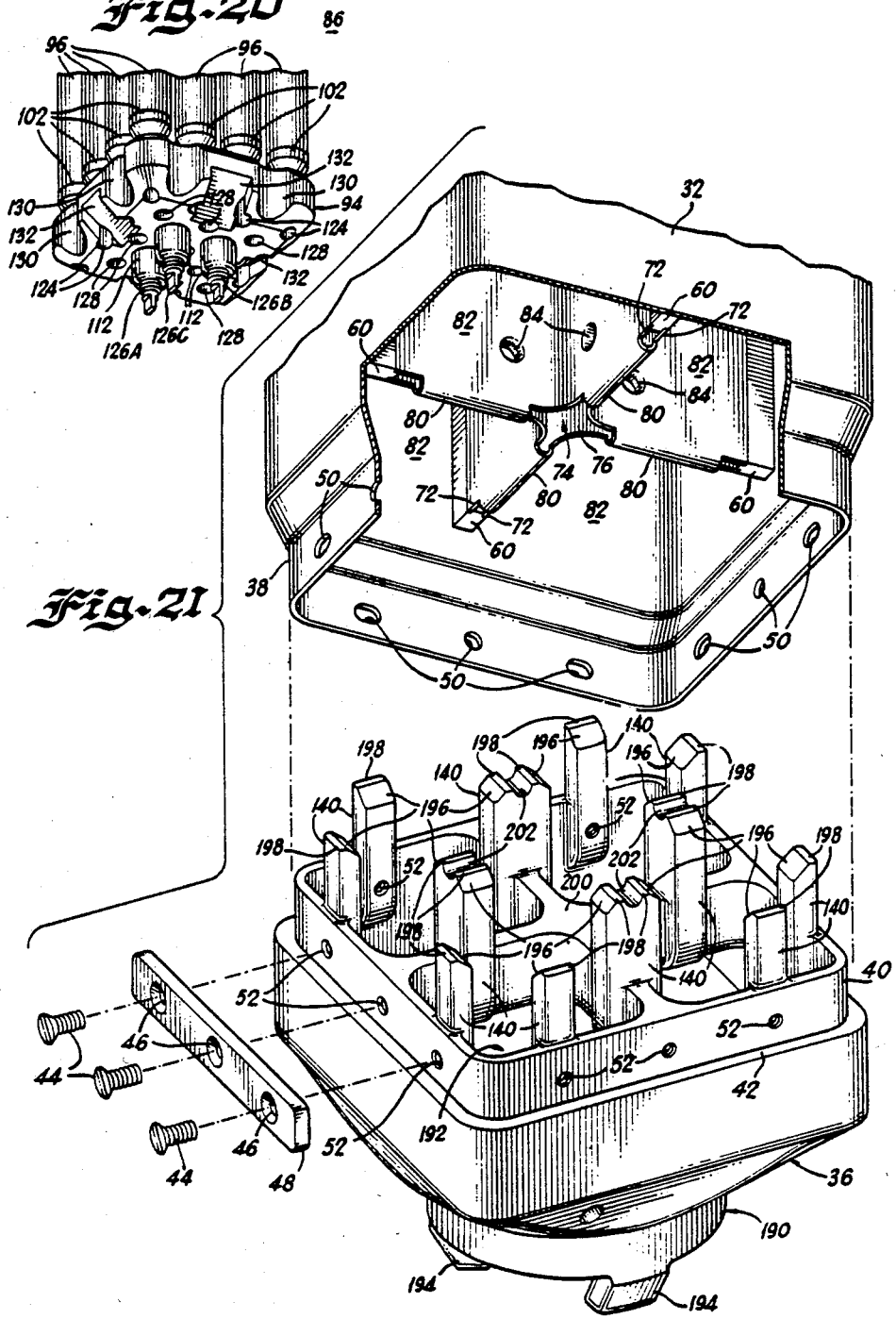

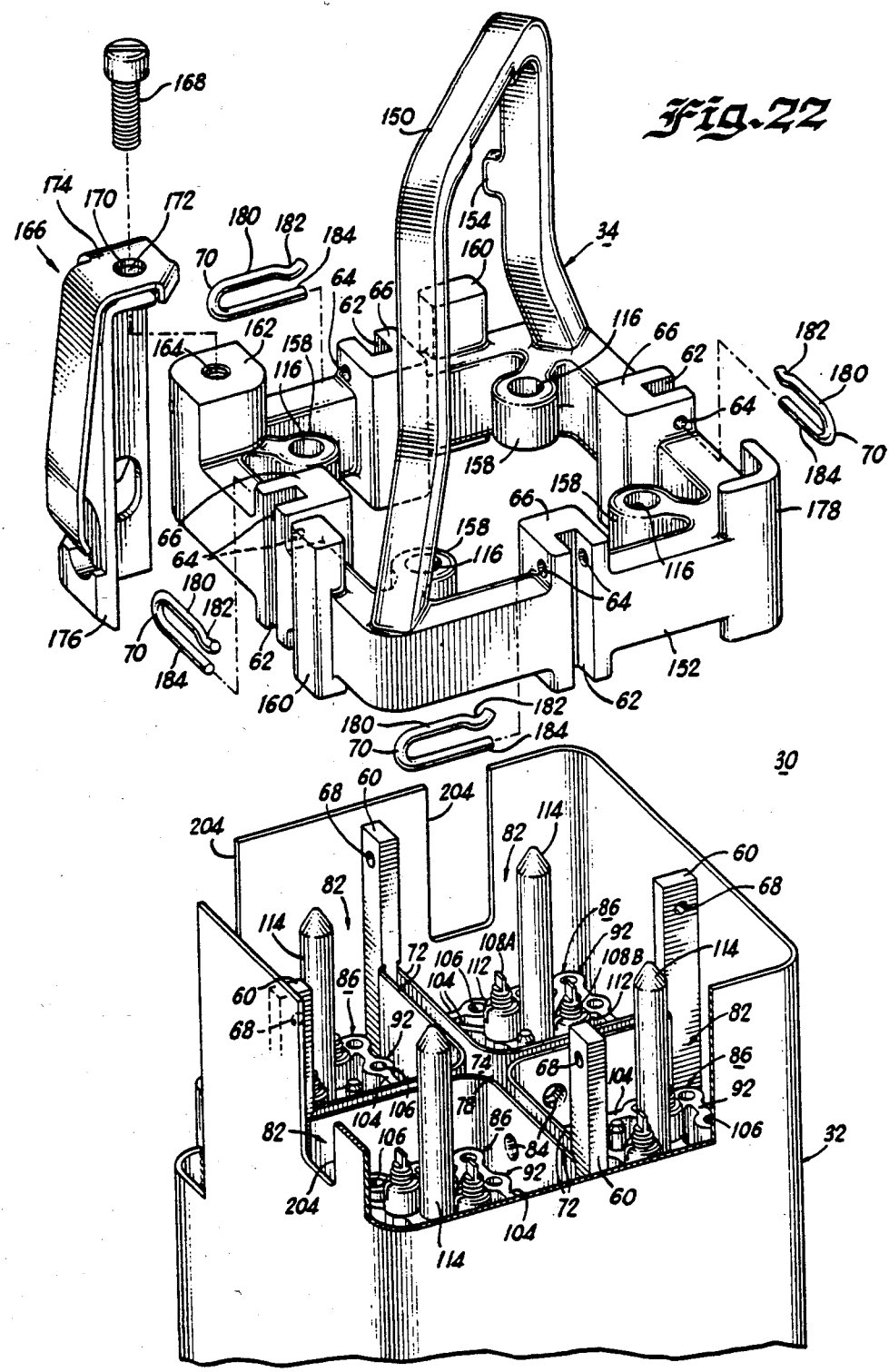

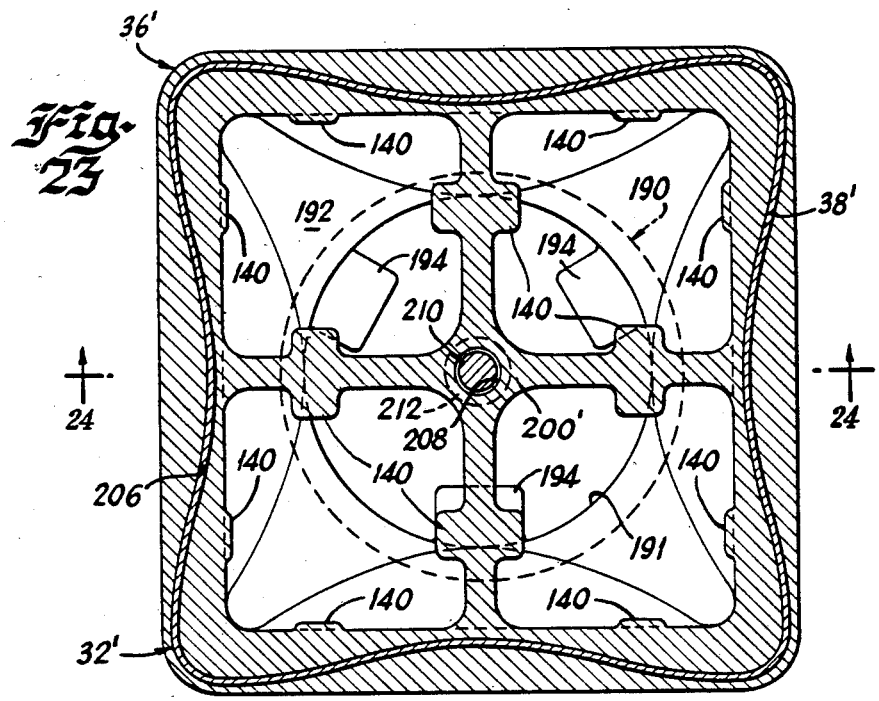
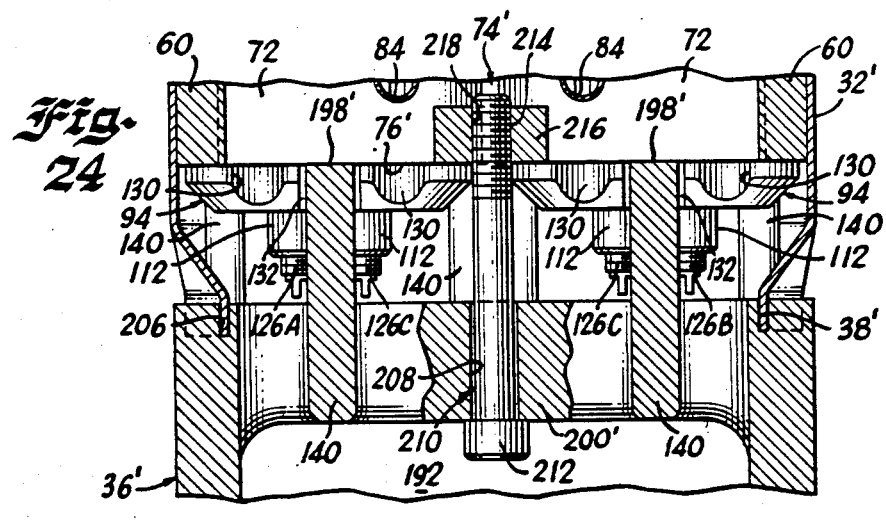

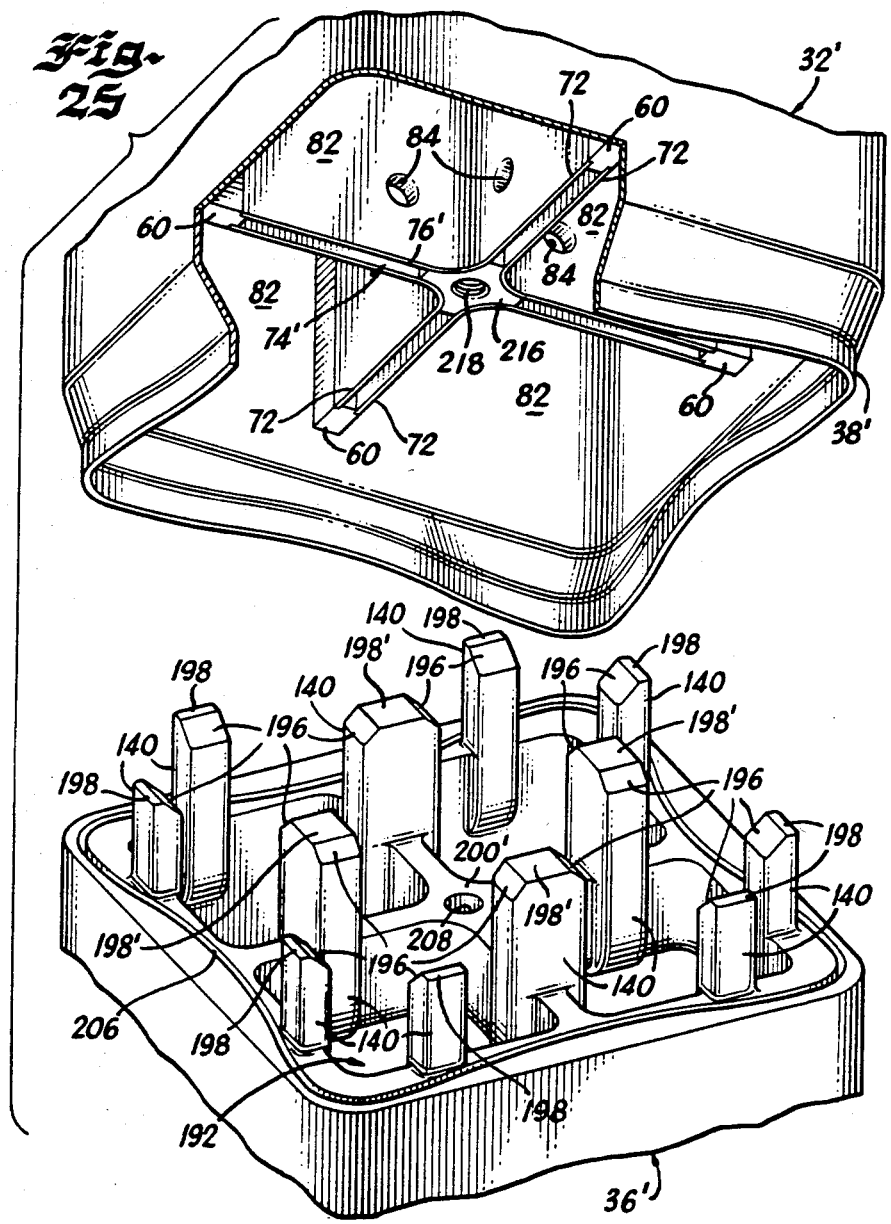

NUCLEAR FUEL ASSEMBLY

This is a division of application Ser. No. 368,555, filed Apr. 15, 1982.

BACKGROUND OF THE INVENTION

A. Field of the Invention

The device of the present invention generally relates to nuclear fuel assemblies for use in nuclear reactors, and, more particularly, to a new and improved nuclear fuel assembly especially adapted for use in a boiling water reactor.

B. Description of the Prior Art

The generation of a large amount of heat energy through nuclear fission in a nuclear reactor is old and now well known. This energy is dissipated as heat in elongated nuclear fuel rods. A plurality of the nuclear fuel rods are grouped together to form separately removable nuclear fuel assemblies. A number of such nuclear fuel assemblies are typically arranged in a matrix to form a nuclear reactor core capable of a self-sustained, nuclear fission reaction. The core is typically submersed in a fluid, such as light water, that serves as a coolant for removing heat from the nuclear fuel rods and as a neutron moderator.

A typical nuclear fuel assembly may be formed by a $7 \times 7$ or an $8 \times 8$ array of spaced-apart, elongated rods supported between upper and lower tie plates. Examples of such typical nuclear fuel assemblies are depicted in and described in U.S. Pat. Nos. 3,350,275; 3,466,226 and 3,802,995. In a typical boiling water reactor nuclear fuel assembly having an $8 \times 8$ rod array, the sixty-four rods that form the $8 \times 8$ array may be either sixty-four fuel rods or one or more non-fueled, water moderator rods with the remaining rods being fuel rods. A common problem in typical boiling water reactor nuclear fuel assemblies of the types depicted in the above-identified patents is that the central region of such fuel assemblies may be under-moderated and over enriched. In order to increase the flow of moderator, one or more elongated, water moderator rods have been substituted for fuel rods in the central region of such nuclear fuel assemblies. For example, water moderator rods 41 and 42 are depicted in and described in the above-identified U.S. Pat. No. 3,802,955. The use of one or more water moderator rods, however, prevents the use of a full complement of 64 fuel rods, i.e., one fuel rod in each rod lattice position within the fuel assembly. Thus, a higher linear heat generation rate may be required when one or more water moderator rods are used in place of one or more fuel rods within the fuel assembly.

In the above mentioned typical boiling water reactor nuclear fuel assembly, the outer flow channel has been formed of an alloy of zirconium known as Zircaloy and is structurally unsupported across its cross section perpendicular to its longitudinal axis. At reactor operating conditions, such an outer flow channel deforms slightly due to creep. Currently, attempts are being made to counteract the creep deformation by using an outer flow channel with thicker walls in order to extend its life. However, using thicker walls increases parasitic absorption in the reactor core with the resultant increase in fuel cycle costs.

Many nuclear fuel assemblies now being used in boiling water reactors have lifting handles bolted to their upper tie plates for handling and moving the fuel assemblies in a vertical position. Thus, the weight of each fuel assembly, including the weight of its outer flow channel, is transmitted from the lifting handle through a plurality of fuel rods commonly referred to as tie rods equipped with special end plug fittings that pass through the upper and lower tie plates of the fuel assembly and are captured with locking nuts. Such tie rods are stressed during handling maneuvers; and such stresses may give rise to fuel rod failures.

SUMMARY OF THE INVENTION

An object of the present invention is to provide a new and improved nuclear fuel assembly.

Another object of the present invention is to provide a new and improved nuclear fuel assembly especially adapted for use in a boiling water reactor.

Another object of the present invention is to provide a new and improved nuclear fuel assembly that includes a centrally disposed, internal, sub-cooled neutron moderator flow path along the length of the fuel assembly while at the same time maintaining a full compliment of fuel rods, that is a fuel rod in each rod lattice position within the nuclear fuel assembly.

Another object of the present invention is to provide a new and improved nuclear fuel assembly that includes a plurality of separate fuel sections along the length of the fuel assembly, each such section having a separate fuel bundle disposed therein.

Another object of the present invention is to provide a new and improved nuclear fuel assembly having a generally centrally disposed, internal, sub-cooled neutron moderator flow path along the length of the fuel assembly, a plurality of separate fuel sections along the length of the nuclear fuel assembly, a fuel bundle of nuclear fuel rods disposed in each separate fuel section and a plurality of fuel bundle coolant flow paths disposed within the nuclear fuel assembly for providing coolant flow between the separate fuel sections.

Another object of the present invention is to provide a new and improved nuclear fuel assembly having a new and improved method and apparatus for lifting and handling the nuclear fuel assembly.

Another object of the present invention is to provide a new and improved method and apparatus for interconnecting and structurally supporting the longitudinal ends and internal components of a nuclear fuel assembly.

Another object of the present invention is to provide a new and improved yoke for a nuclear fuel assembly.

Another object of the present invention is to provide a new and improved nuclear fuel assembly having an elongated outer flow channel, a yoke with a lifting handle structurally interconnected with the outer flow channel at one longitudinal end thereof and a base structurally interconnected with the outer flow channel at the opposite longitudinal end thereof.

Another object of the present invention is to provide a new and improved nuclear fuel assembly for use in refueling or reloading an existing nuclear reactor core wherein the center of the inlet nozzle in the base of the nuclear fuel assembly is off-set with respect to the center of the nuclear fuel assembly.

Another object of the present invention is to provide a new and improved nuclear fuel assembly having an upper tie plate that is axially movable with respect to the lifting handle and the outer flow channel of the nuclear fuel assembly.

Another object of the present invention is to provide a new and improved nuclear fuel assembly having a base structurally interconnected with an outer flow channel by a new and improved joint.

Briefly, the inventive nuclear fuel assembly includes an upper yoke with an integrally formed lifting handle, a base with an inlet nozzle, an elongated, outer flow channel structurally secured to the yoke and the base and an elongated, internal, central water cross, formed by four, elongated metal angles, that divides the fuel assembly into four, separate, elongated fuel sections, each having a separate, elongated fuel bundle or subassembly located therein. Each separate fuel bundle includes an upper tie plate, a lower tie plate and a plurality of elongated fuel rods disposed therebetween. The upper tie plate includes an elongated, axially extending pin that is received with a slip fit within an aperture of the yoke to permit axial movement with respect thereto while restraining any lateral displacement of the fuel bundle.

Four, elongated, solid structural ribs are centrally secured to the inner walls of the outer flow channel and are spaced 90° apart about the inner periphery of the outer flow channel. The lateral outer ends of the four metal angles are secured to the four structural ribs to form the central water cross, thereby providing a centrally disposed path for the flow of subcooled neutron moderator along the lengths of the fuel rods to improve neutron moderation and economy. The central water cross eliminates the need for water moderator rods, thereby enabling a full complement of fuel rods to be used, that is, one fuel rod in each rod lattice position. The central water cross and the four structural ribs located centrally along the lengths of the inner walls of the outer flow channel lower the stress intensity and creep deformation of the outer flow channel by pinning its interior walls at their midspans, reducing the deformable span length by a factor of two to improve the mechanical performance of the fuel assembly. Thus, an outer flow channel having a thinner wall thickness may be used with the central water cross and still exhibit superior creep resistance and mechanical strength properties.

A plurality of coolant flow paths are provided between the separate fuel bundles within the fuel assembly by a plurality of sealed passages formed through the central water cross and distributed along its length. The sealed passages provide coolant pressure equilization between the separate fuel bundles and provide mechanical support between the inner walls of the central water cross while preventing the mixture of fuel bundle coolant flow with the subcooled moderator flowing through the central water cross.

The upper yoke is structurally secured to the upper ends of the four structural ribs secured to the outer flow channel and includes, as integrally formed components, a lifting handle, laterally extending bumpers, a mounting post for a spring assembly, elongated apertures for receiving with a slip fit the axially extending pins mounted on the upper tie plates and elongated slots for the receipt of the four structural ribs. A plurality of locking pins securely attach the yoke to the structural ribs. The lower extremity of the outer flow channel has reduced outer lateral dimensions to permit a tongue and groove connection between the base and the outer flow channel without requiring enlarged lateral dimensions. The base further includes elongated, axially extending, chamfered supports rising upwardly therefrom for receipt and interconnection with oppositely chamfered portions of the lower tie plates of the fuel bundles.

The entire fuel assembly weight is directly transmitted through the lifting handle and yoke, the outer flow channel and the base, upon which the separate fuel bundles are supported, so that during fuel assembly handling operations the fuel rods are not subjected to such loading stresses.

BRIEF DESCRIPTION OF THE DRAWING

The above and other objects and advantages and novel features of the present invention will become apparent from the following detailed description of the embodiments of the invention illustrated in the accompanying drawing wherein:

FIG. 5 is an enlarged, fragmentary, cross sectional view of a portion of the device of FIG. 1 taken along line 5—5 of FIG. 4;

FIG. 7 is an enlarged, fragmentary, cross sectional view of a portion of the device of FIG. 1 taken along line 7—7 of FIG. 4;

FIG. 8 is an enlarged, fragmentary, cross sectional view of a portion of the device of FIG. 1 taken along line 8—8 of FIG. 4;

FIG. 9 is an enlarged, fragmentary, cross sectional view of a portion of the device of FIG. 1 taken along line 9—9 of FIG. 2;

FIG. 10 is an enlarged, fragmentary, partial plan sectional view of a portion of the device of FIG. 1 depicting a modified upper tie plate;

FIG. 11 is an enlarged, plan sectional view of the device of FIG. 1 taken along line 11—11 of FIG. 1;

FIG. 12 is an enlarged, fragmentary, cross sectional view of a portion of the device of FIG. 1 taken along line 12—12 of FIG. 11;

FIG. 13 is an enlarged, fragmentary, partial plan sectional view of a portion of the device of FIG. 1 taken along line 13—13 of FIG. 12;

FIG. 14 is an enlarged, fragmentary cross sectional view of a portion of the device of FIG. 1 taken along line 14—14 of FIG. 11;

FIG. 15 is an enlarged, fragmentary cross sectional view of a portion of the device of FIG. 1 taken along line 15—15 of FIG. 11;

FIG. 16 is an enlarged, plan sectional view of a portion of the device of FIG. 1 taken along line 16—16 of FIG. 1;

FIG. 17 is an enlarged, fragmentary, front elevational view of a portion of the device of FIG. 1 taken along line 17—17 of FIG. 16;

FIG. 19 is an enlarged, broken-away, perspective view of a portion of the device of FIG. 1, specifically of a fuel bundle, without grid spacers, in an assembled condition;

FIG. 20 is an enlarged, fragmentary, lower perspective view of a portion of the device of FIG. 1, specifically of the bottom of a fuel bundle;

FIG. 21 is an enlarged, fragmentary, exploded perspective view of a portion of the device of FIG. 1, specifically of the lower end of the outer flow channel and of the base;

FIG. 22 is an enlarged, fragmentary, exploded perspective view of a portion of the device of FIG. 1, specifically of the yoke, of the upper end of the outer flow channel and of the upper ends of the fuel bundles;

FIG. 23 is an enlarged, top plan view of an alternative embodiment of a base of a nuclear fuel assembly constructed in accordance with the principles of the present invention;

FIG. 24 is an enlarged, fragmentary, cross-sectional view of a portion of the device of FIG. 23 taken along line 24—24 of FIG. 23; and FIG. 25 is an enlarged, fragmentary, exploded perspective view of a portion of the device of FIG. 23, specifically of the lower end of the outer flow channel and of the base of the device of FIG. 23.

DESCRIPTION OF THE PREFERRED EMBODIMENT

Figure 1:
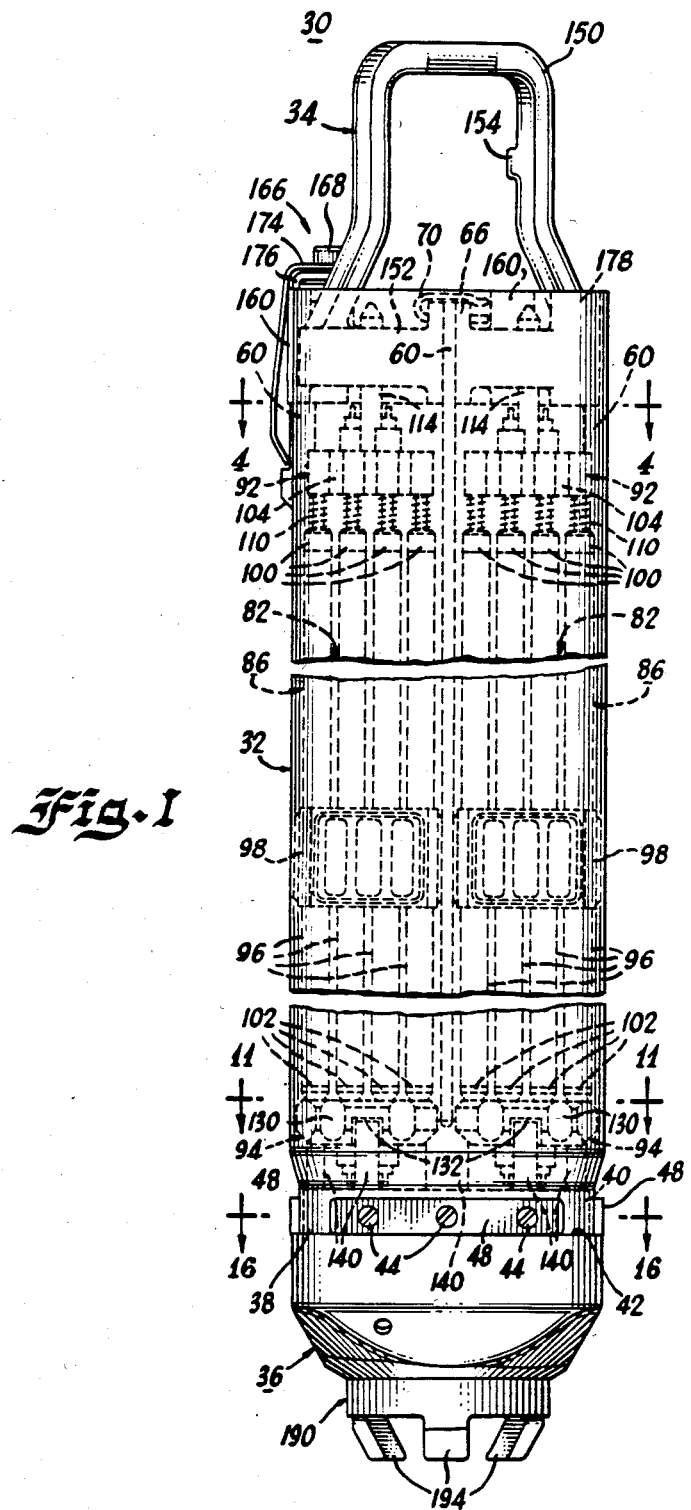
FIG. 1 is a broken away, front elevational view of a nuclear fuel assembly constructed in accordance with the principles of the present invention.
Figure 2:
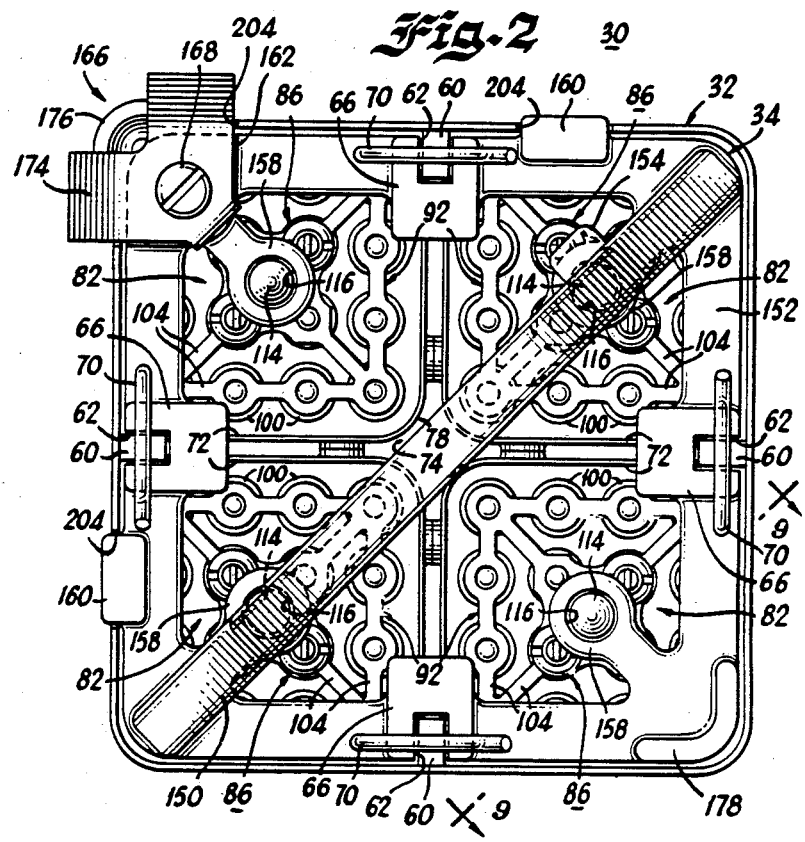
FIG. 2 is an enlarged, top elevational view of the device of FIG. 1.
Figure 3:
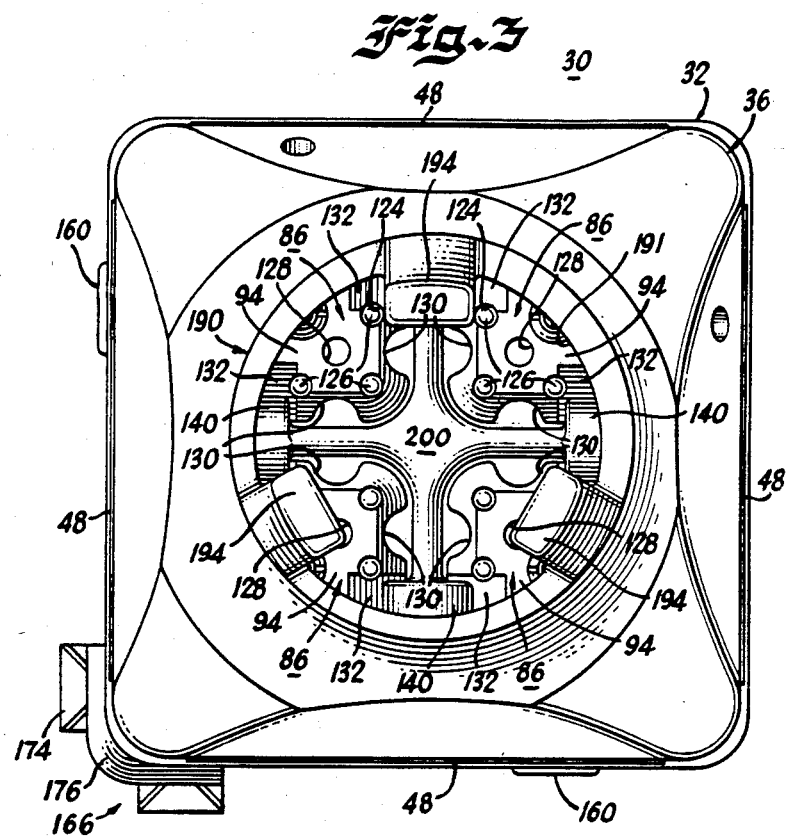
FIG. 3 is an enlarged, bottom elevational view of the device of FIG. 1.
Figure 4:
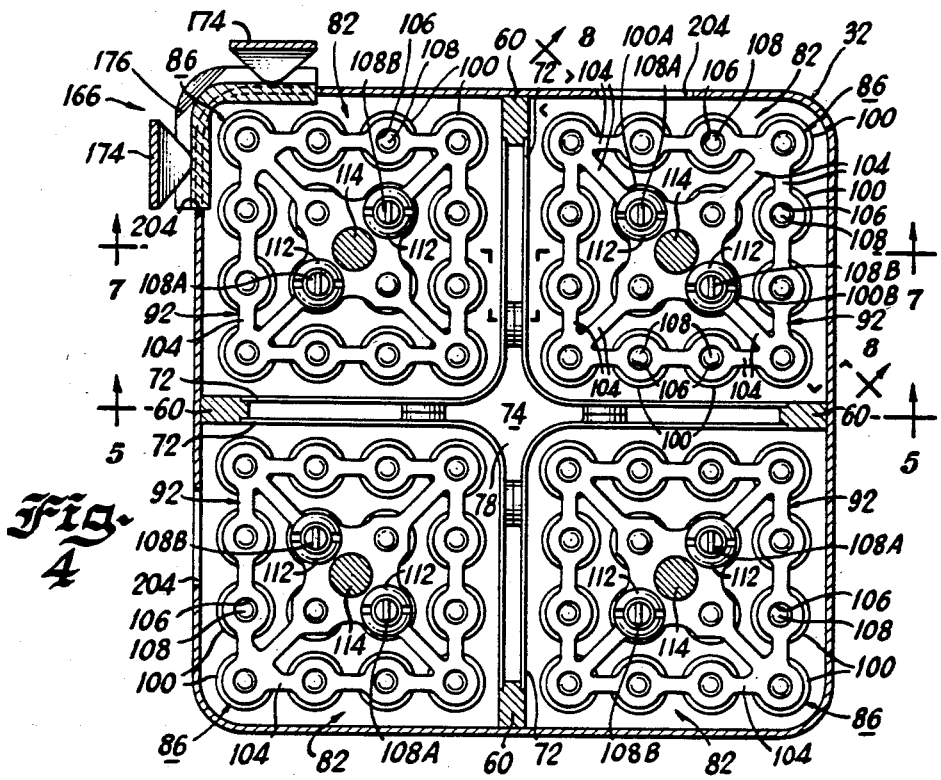
FIG. 4 is an enlarged, plan sectional view of the device of FIG. 1 taken along line 4—4 of FIG. 1.
Figure 6:
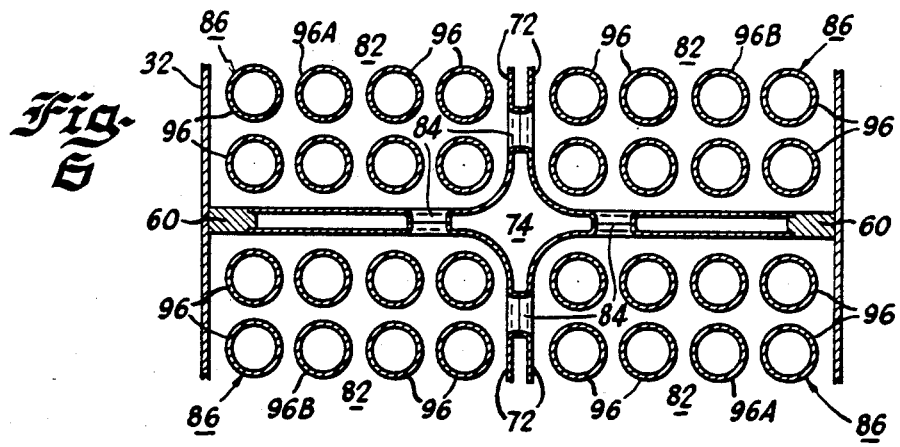
FIG. 6 is an enlarged, fragmentary, partial plan sectional view of a portion of the device of FIG. 1 taken along line 6—6 of FIG. 5.
Figure 18:
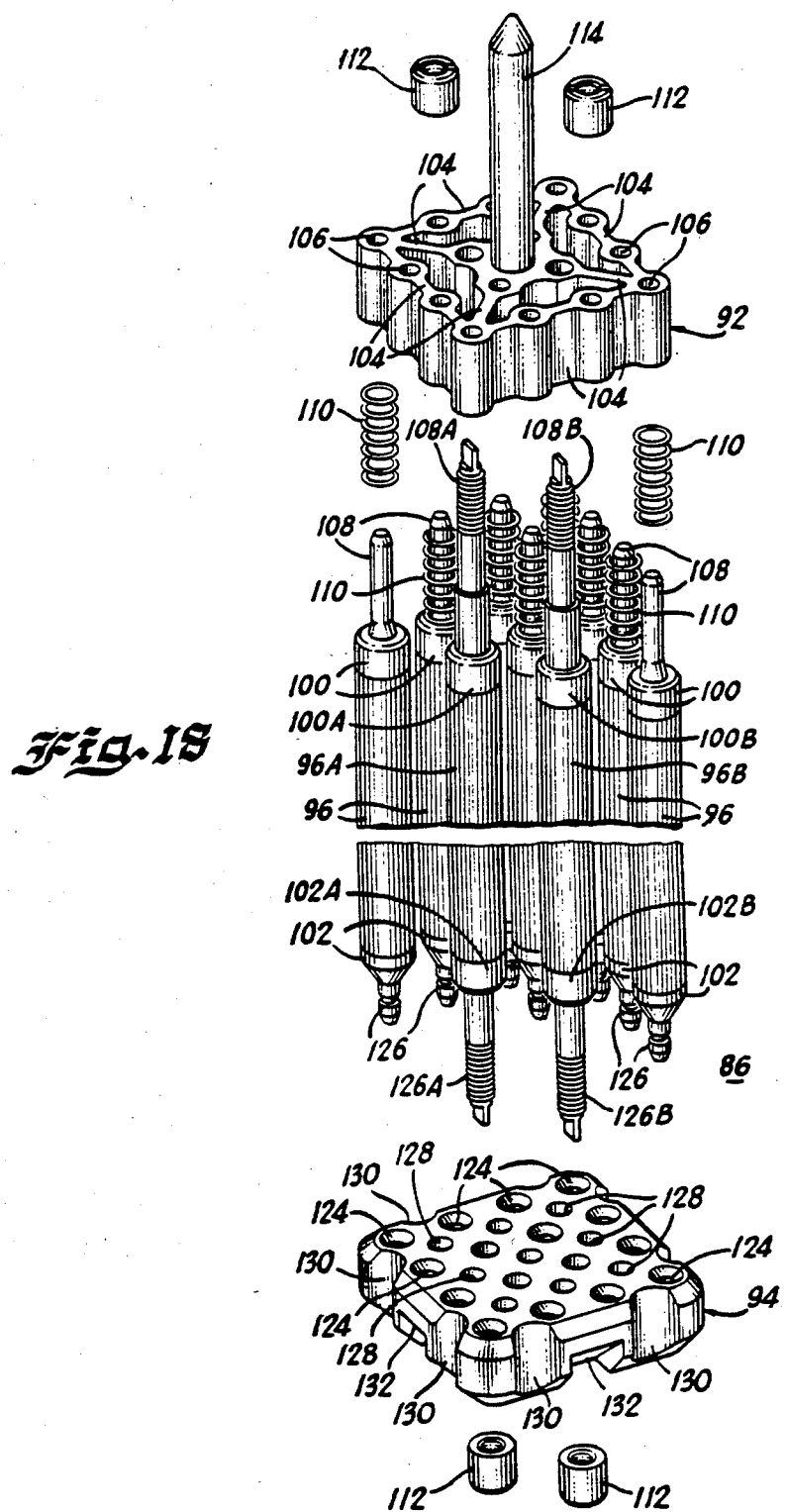
FIG. 18 is an enlarged, broken-away, exploded perspective view of a portion of the device of FIG. 1, specifically of a fuel bundle in a disassembled condition.

Referring to the drawing and initially to FIGS. 1–9 and 11 through 22, there is illustrated a new and improved nuclear fuel assembly 30 constructed in accordance with the principles of the present invention. The fuel assembly 30 includes an elongated, impervious, outer flow channel 32 that is preferably formed from an alloy of zirconium commonly known as Zircaloy, that extends substantially along the entire length of the fuel assembly 30 and that structurally interconnects an upper yoke 34 with a lower base casting or base 36. Preferably, the yoke 34 and the base 36 are formed from reactor grade stainless steel.

A lower end 38 of the outer flow channel 32 is formed radially inwardly to have reduced outer lateral dimensions for enabling a secure structural interconnection between the flow channel 32 and the base 36 without the necessity for exceeding the envelope formed by the outer lateral dimensions of the flow channel 32 above the lower end 38 (FIGS. 1, 12 and 21). Preferably, the flow channel 32 is connected to the base 36 by what may be referred to as a tongue and groove connection formed by the receipt of the lower end 38 (FIG. 21) against an axially or vertically extending, elongated connecting portion 40 with reduced lateral dimensions that extends about the periphery of the base 36. The lower end 38 of the flow channel 32 also is designed to rest against a laterally or radially outwardly extending shoulder 42 that is formed about the periphery of the base 36. Once in position on the shoulder 42 and against the connecting portion 40, the lower end 38 of the flow channel 32 may be secured to the base 36 by the receipt of a plurality of three threaded retaining screws 44 through a plurality of three apertures 46 formed through a metal retaining bar or collar 48 and through a plurality of three apertures 50 formed in the lower end 38 of the flow channel 32 for threaded engagement with three elongated threaded apertures 52 formed through the connecting portion 40 of the base 36. In this manner, each of the four sides of the lower end 38 of the flow channel 32 may be structurally interconnected with the base 36. The outermost two apertures 50 of the three apertures 50 disposed along each side of the lower end 38 of the flow channel 32 are elongated or elliptically shaped apertures 50 to permit relative differential expansion between the lower end 38 of the flow channel 32 and the base 36. Thus, preferably, the two outer retaining screws 44 of the plurality of three retaining screws 44 are tightened somewhat less than the center retaining screw 44 to permit the relative differential expansion to occur.

In accordance with an important feature of the present invention, secured to and centrally located along the lengths of the four inner walls of the flow channel 32 is a plurality of four, spaced apart, solid structural ribs 60 that may be secured to the four inner walls of the flow channel 32 by any convenient means, such as by welding. The lowermost ends of the four ribs 60 terminate slightly above the lower end 38 of the flow channel 32 (FIG. 21); and the upper ends of the four ribs 60 terminate near the upper longitudinal end of the flow channel 32 (FIGS. 5 and 22). The upper ends of the four ribs 60 are designed to be received within four elongated slots 62 (FIGS. 1, 2, 5 and 22) integrally formed through the yoke 34. Communicating with the slots 62 are a plurality of apertures 64 formed through integrally formed, reinforced, generally U-shaped portions 66 of the yoke 34. The apertures 64 are designed to be aligned with an aperture 68 formed through the upper end of each rib 60 for the receipt of a plurality of four, generally U-shaped, locking pins 70 that fixedly secure and structurally interconnect the yoke 34 to the ribs 60 and the flow channel 32.

In accordance with a further important feature of the present invention, a plurality of four, elongated, generally L-shaped angles 72 have their outer lateral ends welded to the structural ribs 60 to form an internal, generally centrally located or central water cross 74 that provides a centrally located closed flow path for subcooled neutron moderator along the length of the fuel assembly 30. The central water cross 74 has its lowermost end 76 (FIG. 21) adjacent the lower end 38 of the flow channel 32 and its uppermost end 78 in the vicinity of the upper end of the flow channel 32 (FIG. 22). Preferably, the lowermost end 76 of the central water cross 74 includes a plurality of integrally formed, moderator flow restrictors 80 for controlling the amount and flow rate of moderator flowing through the central water cross 74. In the preferred embodiment, elongated portions of the lowermost ends of an angle 72 are formed inwardly to contact adjacent elongated, inwardly formed portions of a facing angle 72. If desired, the elongated contacting edges of the angles 72 may then be welded to form the flow restrictors 80.

In accordance with an important feature of the present invention, the central water cross 74 together with the inner walls of the flow channel 32 divide the fuel assembly 30 into four, separate, elongated, fuel sections or quadrants 82 along the length of the fuel assembly 30. A plurality of sealed passages 84 formed through the central water cross 74 provide for coolant flow between the separate fuel sections 82. The sealed passages 84 are distributed along the length of the central water cross 74 and provide for fuel bundle coolant pressure equalization between adjacent ones of a plurality of four, separate, elongated fuel bundles or subassemblies 86, individually located in each of the four separate fuel sections 82. Preferably, the sealed passages 84 (FIGS. 2, 4–7, 21 and 22) are formed by deflecting inwardly towards the center of the central water cross 74 the punched out or cutout portions of facing surfaces of the angles 72 in the area of the sealed passages 84 until those edges contact each other to form a generally cylindrical passage. Subsequently, one or more internal circumferential welds may be used to seal the abutting ends of those punched out or cutout portions of the angles 72 to form the sealed passages 84 that enable fuel bundle coolant flow between adjacent bundles 86 while simultaneously preventing the intermixing of fuel bundle coolant flow with subcooled neutron moderator flowing through the central water cross 74.

Each fuel bundle 86 (FIGS. 1, 2, 4, 5, 7, 8, and 18–20) includes an upper tie plate 92, a lower tie plate 94 and a plurality of elongated fuel rods 96 disposed therebetween. In the preferred embodiment, each fuel bundle 86 includes a plurality of sixteen fuel rods 96 arranged in a 4×4 array; and each fuel rod 96 includes an upper end plug 100 and a lower end plug 102. In addition, each fuel bundle 86 includes a plurality of spacer grids 98 (one of which is depicted in FIG. 1 for illustrative purposes only) spaced apart axially along its length by any suitable means, such as a conventional spacer capture fuel rod. The precise number and configuration of the spacer grids 98 should be selected in accordance with the particular thermal, hydraulic, nuclear and mechanical properties of a specific fuel bundle 86 and fuel assembly 30.

In accordance with an important feature of the present invention, the upper tie plate 92 is fabricated as a connected series of thin metal bars or strips 104 and is formed by any convenient means such as by casting or machining. At each of the sixteen fuel rod lattice positions, a small cylindrical aperture 106 is drilled or otherwise formed to receive with a slip fit an elongated, vertical extension 108 of the upper end plug 100 of the fuel rod 96. The slip fit between the upper tie plate 92 and the fuel rods 96 permit relative axial movement therebetween. A plurality of elongated compression springs 110 are disposed over the vertical extensions 108 of the upper end plugs 100 and bear against the lower surface of the upper tie plate 92 to maintain the fuel rods 96 seated in the lower tie plate 94 and to support the upper tie plate 92.

Preferably, at least two fuel rods 96A and 96B in each fuel bundle 86 are tie rods that are used to interconnect as a unit the upper tie plate 92, the lower tie plate 94 and the plurality of fuel rods 96. The two tie rods 96A and 96B include threaded elongated vertical extensions 108A and 108B of their upper end plugs 100A and 100B that pass through apertures 106 in the upper tie plate 92 for the receipt of threaded locking or retaining nuts 112.

The upper tie plate 92 also includes an elongated vertical post or locating pin 114 that is designed to pass through and to be received with a slip fit by one of a plurality of four, integrally formed, pin receiving apertures 116 (FIG. 22) in the yoke 34 for permitting relative axial or vertical motion between the fuel bundle 86 and both the yoke 34 and the flow channel 32 while restraining lateral or radial motion of the fuel bundle 86.

In accordance with a further important feature of the present invention, the lower tie plate 94 (FIGS. 1 and 18–20) includes a plurality of fuel rod locating apertures 124 that are disposed at each fuel rod lattice position for the receipt of elongated vertical extensions 126 of the lower end plugs 102 of the fuel rods 96. The two tie rods 96A and 96B have lower end plugs 102A and 102B that respectively include threaded elongated vertical extensions 126A and 126B that pass through apertures 124 in the lower tie plate 94 for receipt of threaded locking or retaining nuts 112 (FIGS. 19–20), thereby enabling the entire fuel bundle 86 to be lifted and handled as an entity. A third threaded locking or retaining nut 112 (FIG. 20) may be utilized to securely retain a threaded elongated vertical extension 126C of a spacer capture fuel rod 96, if used, in engagement with the lower tie plate 94.

The lower tie plate 94 includes a plurality of fuel bundle coolant flow apertures 128 formed therethrough and a plurality of elongated, vertically extending, fuel bundle coolant flow cutouts 130 formed along the outer periphery of the lower tie plate 94 to provide flow passages for fuel bundle coolant flow along the lengths of the fuel rods 96. A plurality of four chamfered cutouts 132 are formed in and rise from the bottom surface of the lower tie plate 94 to receive and be supported by four, elongated, vertically extending, oppositely chamfered supports 140 (FIGS. 1, 12 and 21) integrally formed in and rising upwardly from the base 36. In this manner, the lower tie plate 94 and thus the fuel bundle 86 is spaced above and securely supported by the base 36.

In accordance with a further important feature of the present invention, the upper yoke 34 (FIGS. 1, 2, 5, 7–9 and 22) includes an integrally formed lifting bail or handle 150 that projects upwardly from and diagonally across a generally square shaped body portion or frame 152 of the yoke 34 that is of a minimum size and mass in order to minimize the fluid pressure drop thereacross. The handle 150 includes an orientation indicating boss 154 and is designed to be engaged by a lifting mechanism for lifting and handling the fuel assembly 30 in a vertical position. The pin receiving apertures 116 are formed through four integrally formed lobes 158 extending radially inwardly from the four corners of the frame 152 along its diagonals. By interconnecting all four bundles 86 through the apertures 116 in the lobes 158, the yoke 34 causes the bundles 86 to move together and thereby minimizes loadings that otherwise might occur from one bundle 86 to another.

The yoke 34 further includes a plurality of elongated, laterally extending bumpers 160 integrally formed on the frame 152 for contacting, if necessary, similarly configured bumpers on adjacent fuel assemblies to provide a minimum spacing and fluid gap between adjacent fuel assemblies. The yoke 34 further includes a mounting post 162 integrally formed on the frame 152 and having an elongated threaded aperture 164 formed therein for receiving a spring assembly 166 and an elongated, threaded, spring assembly retaining bolt 168. The bolt 168 is designed to pass through a pair of apertures 170 and 172 respectively formed through a bi-directional leaf spring 174 and a mounting plate or angle 176 for for threaded engagement with the aperture 164 to retain the spring assembly 166 in engagement with the mounting post 162. The bi-directional leaf spring 174 is designed to contact corresponding leaf springs on adjacent fuel assemblies to maintain spacing between adjacent fuel assemblies and to transmit loads from one fuel assembly to another. Disposed diagonally opposite to the mounting post 162 is an elongated, vertically extending bumper 178 (FIGS. 9 and 22) that is designed to transmit loads from the spring assembly 166 to the upper internal structure of the reactor core to prevent any significant moment due to such loads from being applied to the fuel assembly 30. To accommodate the radially outwardly projecting portions of the bumpers 160 and of the spring assembly 166, the upper end of the outer flow channel 32 (FIGS. 2, 7 and 22) should be provided with a plurality of appropriately configured cutouts 204.

Each generally U-shaped locking pin 70 includes an elongated, spring biased upper leg 180 having a downwardly depending portion 182 at its outermost end. Each locking pin 70 further includes an elongated generally straight lower leg 184 that is designed to be received through aligned apertures 64 and 68. When the lower leg 184 is passed through the aligned apertures 64 and 68, the spring biased upper leg 180 snaps or springs in the direction of the lower leg 184 to position the downwardly depending portion 182 in engagement with an adjacent upper vertical edge of the U-shaped portion 66 of the yoke 34, thereby maintaining the locking pin 70 in a releasable, locked engagement with the structural rib 60 and the yoke 34.

The base 36 (FIGS. 1, 3, 14–16 and 21) includes an inlet nozzle 190 having an inlet opening or aperture 191 for the receipt of coolant or moderator flow. As is apparent in FIGS. 3 and 16, due to its eccentrically formed structure, the center of the nozzle 190 is offset from the center of the base 36 and of the fuel assembly 30, while the inlet opening 191 is concentric with the center of the base 36 and of the fuel assembly 30. The nozzle 190 may be eccentrically formed during the casting of the base 36 or subsequent thereto by machining the material of the base 36 that forms the nozzle 190 to vary the thickness of the nozzle 190 about its periphery. Thus, fuel assemblies 30 having larger outer lateral dimensions may be used to replace spent fuel assemblies having smaller outer lateral dimensions during the refueling of a nuclear reactor core.

Disposed above the nozzle 190 is an opening or plenum region 192 for the receipt of the flow of coolant or moderator and for the distribution thereof to the lower tie plates 94 of the fuel bundles 86 and to the center water cross 74. Extending downwardly from the inlet nozzle 190 is a plurality of three legs 194 that are angled radially inwardly in order to align the base 36 and thus the fuel assembly 30 within the reactor core internals and within mounting structure in fuel storage racks.

Chamfered supports 140 rising from the base 36 include chamfered surfaces 196 rising from a vertically extending, elongated, inwardly disposed lateral surface of each support 140 and terminating at the upper surface 198 of each support 140. The four supports 140, centrally disposed within the base 36 and integrally formed on a cruciform shaped, laterally extending, base support member 200, include a pair of chamfered surfaces 196 respectively designed to contact, seat and support oppositedly chamfered cutouts 132 in the lower tie plates 94 of two, adjacent, separate fuel bundles 86. The upper surfaces 98 of the four, centrally disposed supports 140 also include an elongated, curved recess 202 formed therein to provide clearance for the flow restrictors 80 of the central water cross 74 (FIG. 21).

Obviously, many modifications and variations of the present invention are possible in light of the above teachings. For example, in an alternative embodiment of an upper tie plate 92' (FIG. 10), integrally formed lateral or radial extensions 120 of the metal bars or strips 104 are used to further restrain or limit both lateral or radial movement of the fuel bundle 86 and rotational displacement of the fuel bundle 86 about its longitudinal axis. In addition, an alternative embodiment of the outer flow channel 32' (FIGS. 23–25) of the fuel assembly 30 includes a lower end 38' formed at its longitudinal end with a laterally extending, generally serpentine shaped cross sectional configuration for receipt within an elongated groove 206 formed in the base 36' with a mating serpentine shaped cross sectional configuration. As in the embodiment depicted in FIG. 21, the lower end 38' is formed radially inwardly to have reduced outer lateral dimensions compared to the outer lateral dimensions of the portion of the flow channel 32' above the lower end 38' in order to permit a secure structural tongue and groove interconnection between the flow channel 32' and the base 36' without the necessity for exceeding the envelope formed by the outer periphery of the flow channel 32' or of the base 36'. The central water cross 74' is formed at its lowermost or inlet end 76 without the moderator flow restrictors 80 (FIG. 21). Thus, upper planar surfaces 198' formed on the top surfaces of the four centrally located chamfered supports 140 integrally formed on and rising from the cruciform shaped, laterally extending base support member 200' serve as flow restrictors to limit the amount and flow rate of moderator flowing through the central water cross 74'.

The base support member 200' includes an elongated, vertically extending aperture 208 formed through the center thereof for receipt of a threaded bolt 210 (FIG. 24). The inner diameter of the aperture 208 is designed to be less than the outer diameter of a head 212 of the bolt 210 that serves as a stop and a bearing surface for securing the flow channel 32' in engagement with the base 36'. An elongated threaded end 214 of the bolt 210 is designed to engage an elongated, centrally disposed, threaded aperture 218 in a locking or retaining nut 216. The nut 216 may be secured in position at the center of the lowermost end 76' of the central water cross 74' by any suitable means, such as by welding. When the bolt 210 is sufficiently tightened so that the threaded end 214 is properly engaged by the threaded aperture 218 of the nut 216, the lower end 38' of the flow channel 32' will be securely retained within the groove 206.

What is claimed and desired to be secured by Letters Patent is:

1. A nuclear fuel assembly comprising an elongated, impervious outer flow channel; and a plurality of fuel bundles separately disposed within and along the length of said outer flow channel, wherein each of said fuel bundles includes an upper tie plate, a lower tie plate and a plurality of nuclear fuel rods disposed between said upper tie plate and said lower tie plate, at least two said fuel rods being tie rods interconnecting said upper and lower tie plates; further comprising an upper yoke having a fuel assembly lifting handle secured thereto, said upper yoke being secured to said outer flow channel at one longitudinal end of said outer flow channel; and further comprising means for enabling relative axial movement between said upper tie plate and said upper yoke.

2. A nuclear fuel assembly comprising an elongated, impervious outer flow channel; and a plurality of fuel bundles separately disposed within and along the length of said outer flow channel, wherein each of said fuel bundles includes an upper tie plate, a lower tie plate and a plurality of nuclear fuel rods disposed between said upper tie plate and said lower tie plate, at least two said fuel rods being tie rods interconnecting said upper and lower tie plates; further comprising an upper yoke having a fuel assembly lifting handle secured thereto, said upper yoke being secured to said outer flow channel at one longitudinal end of said outer flow channel; and further comprising means for enabling relative axial movement between said upper tie plate and said upper yoke, wherein said relative axial movement enabling means comprises an elongated axially extending pin secured to said upper tie plate and an axially aligned pin receiving aperture formed in said upper yoke, said pin being received with a slip fit within said pin receiving aperture.

3. A nuclear fuel assembly comprising a plurality of separately disposed fuel bundles; and elongated means disposed within said fuel assembly and externally of said fuel bundles for separating said fuel assembly into a plurality of elongated, separate fuel sections, one of said plurality of fuel bundles being disposed in each one of said separate fuel sections, wherein said elongated separating means further comprises means for providing an elongated, moderator flow path for subcooled neutron moderator along the length of said fuel assembly, and wherein each of said fuel bundles includes an upper tie plate, a lower tie plate and a plurality of nuclear fuel rods disposed between said upper tie plate and said lower tie plate, at least two said fuel rods being tie rods interconnecting said upper and lower tie plates; and further comprising an elongated outer flow channel, an upper yoke secured to said outer flow channel at one longitudinal end of said outer flow channel and means for enabling relative axial movement between said upper tie plate and said upper yoke.

4. A nuclear fuel assembly comprising a plurality of separately disposed fuel bundles; and elongated means disposed within said fuel assembly and externally of said fuel bundles for separating said fuel assembly into a plurality of elongated, separate fuel sections, one of said plurality of fuel bundles being disposed in each one of said separate fuel sections, wherein said elongated separating means further comprises means for providing an elongated, moderator flow path for subcooled neutron moderator along the length of said fuel assembly, and wherein each of said fuel bundles includes an upper tie plate, a lower tie plate and a plurality of nuclear fuel rods disposed between said upper tie plate and said lower tie plate, at least two said fuel rods being tie rods interconnecting said upper and lower tie plates; and further comprising an elongated outer flow channel, an upper yoke secured to said outer flow channel at one longitudinal end of said outer flow channel and means for enabling relative axial movement between said upper tie plate and said upper yoke, wherein said relative axial movement enabling means comprises an elongated axially extending pin secured to said upper tie plate and an axially aligned pin receiving aperture formed in said upper yoke, said pin being received with a slip fit within said pin receiving aperture.

5. A nuclear fuel assembly as recited in claim 4, also comprising a lower base, said lower base being secured to said outer flow channel at the opposite longitudinal end of said outer flow channel by a tongue and groove connection.

6. A nuclear fuel assembly as recited in claim 5 wherein said outer flow channel is formed with reduced outer lateral dimensions at said opposite longitudinal end thereof.

7. A nuclear fuel assembly as recited in claim 6 further comprising a plurality of threaded retaining screws, a multiplicity of metal retaining bars, a plurality of apertures formed in said multiplicity of metal retaining bars, a plurality of apertures formed in said opposite longitudinal end of said outer flow channel and a plurality of apertures formed in said lower base, said multiplicity of metal retaining bars peripherally surrounding at least portions of said opposite longitudinal end of said outer flow channel, said opposite longitudinal end of said outer flow channel peripherally surrounding said lower base, with said lower base being secured to said outer flow channel by the receipt of said plurality of threaded retaining screws through said plurality of apertures in said multiplicity of metal retaining bars, through said plurality of apertures formed in said opposite longitudinal end of said outer flow channel and through said plurality of apertures formed in said lower base.

* * * * *